United States Patent
Lakes

(10) Patent No.: US 6,309,495 B1
(45) Date of Patent: Oct. 30, 2001

(54) METHOD OF MAKING A SEALABLE WEB OR SHEET PRODUCT

(75) Inventor: A. Dale Lakes, Dayton, OH (US)

(73) Assignee: The Standard Register Company, Dayton, OH (US)

(*) Notice: Subject to any disclaimer, the term of this patent is extended or adjusted under 35 U.S.C. 154(b) by 0 days.

(21) Appl. No.: 08/446,295

(22) Filed: May 22, 1995

Related U.S. Application Data

(62) Division of application No. 08/137,597, filed on Oct. 15, 1993, now Pat. No. 5,486,436.

(51) Int. Cl.$^7$ .............................. B31F 1/00; B32B 31/00
(52) U.S. Cl. ....................... 156/227; 156/283; 283/56; 427/197; 427/202
(58) Field of Search ..................... 156/227, 283; 427/202, 197; 283/56

(56) References Cited

U.S. PATENT DOCUMENTS

| | | | |
|---|---|---|---|
| 1,297,406 | * 3/1919 | Schoder | 427/197 |
| 2,855,324 | 10/1958 | Van Dorn . | |
| 3,794,550 | * 2/1974 | Taillie | 156/283 |
| 4,245,025 | 1/1981 | Kato et al. . | |
| 4,268,579 | * 5/1981 | Suzuki et al. | 427/202 |
| 4,828,636 | * 5/1989 | Rausing | 156/227 |
| 4,846,454 | 7/1989 | Parklander . | |
| 5,017,416 | 5/1991 | Imperial et al. . | |
| 5,045,426 | 9/1991 | Maierson et al. . | |
| 5,102,737 | 4/1992 | Josephy et al. . | |
| 5,123,892 | 6/1992 | Lin . | |
| 5,213,560 | 5/1993 | Crowley . | |

FOREIGN PATENT DOCUMENTS

| | | |
|---|---|---|
| 245424 | 3/1990 | (EP) . |
| 291897 | 1/1992 | (EP) . |
| 8505243 | 11/1985 | (SE) . |

* cited by examiner

*Primary Examiner*—John J. Gallagher
(74) *Attorney, Agent, or Firm*—Killworth, Gottman, Hagan & Schaeff, L.L.P.

(57) ABSTRACT

A web or sheet product is provided which is coated on at least a portion of its surface with a bond-enabling material for adhering toner particles on the surface of the sheet. The sheet product can be used as a mailer or confidential form which is sealed using toner particles as the adhesive. The bond-enabling material may be a polymer which is coated on the sheet as a liquid and then cured to form a film on the surface of the sheet. The bond-enabling material is resistant to melting or degrading when exposed to temperatures used for fusing toner particles, and additionally may act as a tie coat to enhance the adhesion of toner particles to the surface of the sheet. The bond-enabling material may be coated on the peripheral edges of the sheet, and toner particles are printed over the bond-enabling material on the peripheral edges of the sheet. The sheet is folded and sealed by the application of heat and pressure to the edges of the sheet.

9 Claims, 5 Drawing Sheets

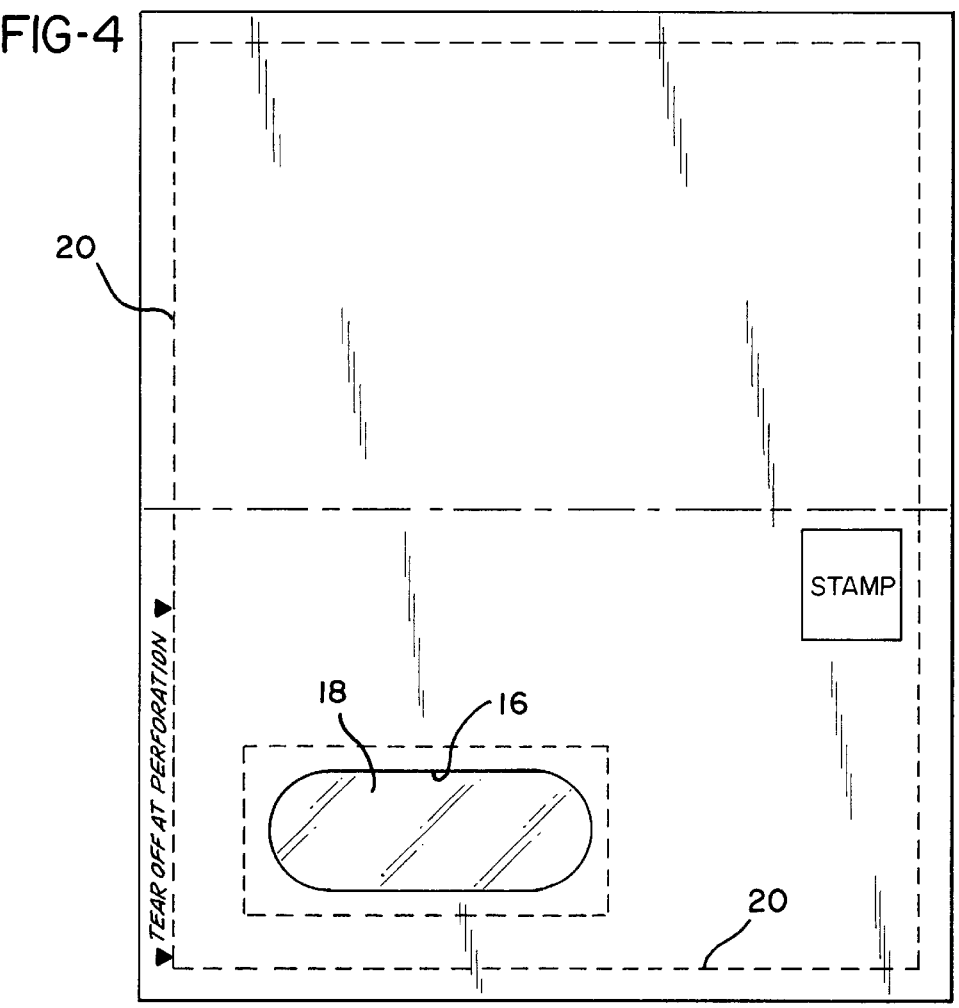
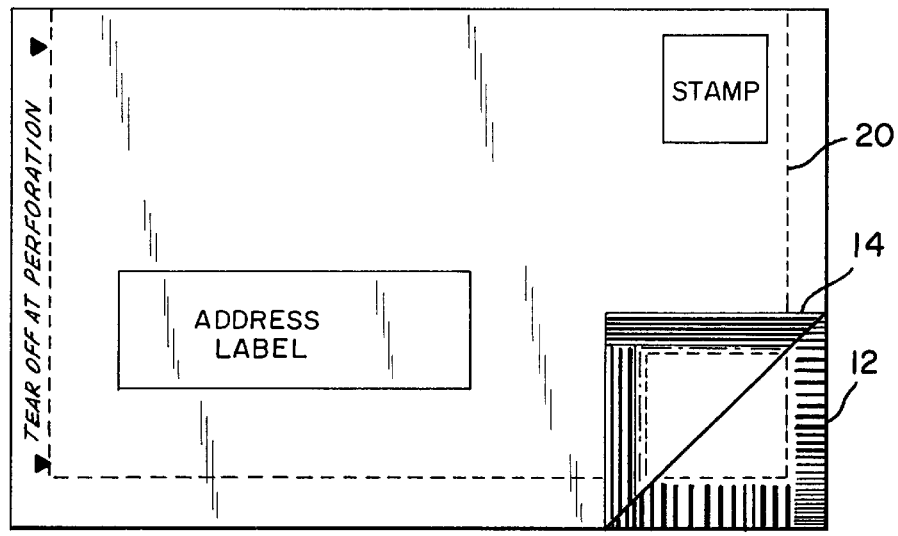

METHOD OF MAKING A SEALABLE WEB OR SHEET PRODUCT

This is a division of application Ser. No. 08/137,597, filed Oct. 15, 1993, now U.S. Pat. No. 5,486,436.

BACKGROUND OF THE INVENTION

This invention relates to a method and apparatus for sealing the edges of mailers or other business forms, and more particularly to a cellulosic or polymeric web or sheet product which is coated on its peripheral edges with a bond-enabling material. When toner particles are printed onto the peripheral edges of the sheet over the bond-enabling material, the sheet may be folded and sealed at its edges using the toner as the adhesive by the application of heat and pressure.

In recent years, mailers and other business forms have been developed for printing in high speed impact printers which use ribbons for printing. The forms are typically single-ply continuous forms having variable information printed on one surface of the form. During the manufacture of such forms, hot-melt adhesive is applied at selected marginal edges of the forms for later use in sealing the forms. After printing, the forms are folded and then passed through a device which applies heat and pressure, activating the hot melt adhesive and causing the folded plies to be sealed together along the their common marginal edges.

However, with the advance of microcomputer technology, business forms and mailers are now printed on a wide variety of commercial printing devices which are faster, quieter, and more reliable than traditional mechanical impact printers. Laser printers are an example of a nonimpact printing device, which operate by turning on and off a computer-controlled laser beam of light in a specific pattern to form a latent image of static charges on a paper web. The portion of the web containing the static charges attracts toner particles and forms a toner image, which is then fused on the paper by passing the paper through a pair of rolls which apply both heat and pressure to the paper to bond the toner particles permanently to the paper.

However, mailers and business forms which utilize hot melt adhesives for sealing are not suitable for imaging in laser printers because the high temperatures required to fuse the toner particles to the paper also melt the adhesives on the paper, which then become tacky and jam the hot printer rollers.

An alternative method of sealing in the art involves the use of a self-adhesive or pressure seal made from rubber latex dispersed in water. When applied to a surface and dried, a film is formed which will not bond on contact with paper and other surfaces, but will bond on contact with another film of the same material. These adhesive films are heat resistant and, if properly formulated, do not become tacky to other surfaces when heated. However, formulation of commercially trouble-free self-adhesives has not been completely successful. In addition, self-adhesive seals have a short shelf life of about three months or less.

Recently, a number of attempts have been made to utilize the adhesive properties of toner particles used in nonimpact printers to seal mailers and other business forms. For example, European patent No. 245424 describes a machine for sealing a sheet which has been coated on its peripheral edges with toner particles by a laser printer. The sheet is folded in the form of an envelope and then passed through first and second sealing zones comprising heated, driven pairs of sealing discs which heat the toner particles, causing them to become tacky and adhere to each other, thus sealing the sheet.

Swedish Patent Application No. 8505243 also teaches a sheet material coated with strips of heat-activatable electronically printed toner strips on its edges. The sheet is folded so that the strips come into contact with each other, then the sheet is advanced through a machine having a heating zone which applies heat and pressure to seal the sheet in the form of an envelope.

However, a disadvantage of these methods is that when the toner material is fused to the paper during the laser printing process, it tends to impregnate, or sink into the paper so that there is little toner remaining on the surface of the paper to form a strong bond when the paper is folded and sealed. As a result, the bond formed by the sealing operation is very weak, and the mailer may inadvertently open before it reaches the intended recipient.

Accordingly, the need still exists in the art for adhesively bonding both porous and non-porous surfaces utilizing toner material as an adhesive to provide a strong bond.

SUMMARY OF THE INVENTION

The present invention meets that need by providing a porous or nonporous web or sheet product and method in which a bond-enabling material is coated onto the web or sheet so that toner particles which are printed on coated areas of the sheet remain firmly bonded on the surface thereof. The present invention is applicable to all non-impacting printing processes, including but not limited to laser, magnetographic, ion deposition and thermal transfer printing, which utilize dry toner particles. The areas of the web or sheet printed with toner may be contacted with other areas of the web which have toner printed thereon or with a second web or sheet having toner to provide a sealed business form or mailer having a strong adhesive bond.

In accordance with one aspect of the present invention, a web or sheet is provided comprising a substrate having two major surfaces. Preferably, at least a portion of one major surface of the sheet is coated with a bond-enabling material for adhering toner particles on the surface of the sheet.

In addition to the effectiveness of the bond-enabling coatings of this invention when applied to porous substrates such as paper or other cellulosic materials, it has also been discovered that these coatings are effective when applied to non-porous polymeric substrates such as, for example, polyesters, polycarbonates, polyolefins, cellulose acetate, polystyrene and its copolymers, polyurethanes, polyvinyl chloride, polysulfones and polyimides. In some instances it is desirable to print onto polymeric substrates with printers or copiers which use particulate toners, and then seal these printed surfaces together. For example, images on transparent film or sheets are used in optical projection, or for certain label applications. Untreated polymeric films and sheets normally do not form strong adhesive bonds with toners used in non-impact printers, at least partly because of the low surface energy of such polymeric surfaces. Adhesion of toners can be greatly enhanced by treating such surfaces with a thin layer of a bond-enabling material to form a tie coat which serves as a bridge between the surface and the toner particles normally used in such non-impact printers as laser, magnetographic, ion, and thermal transfer. This enhanced bonding makes it practical for toners to participate in adhesively bonding two polymeric surfaces previously treated with the bond-enabling coatings of this invention.

In accordance with another aspect of the invention, a non-porous web or sheet is provided, comprising a polymeric substrate having two major surfaces. At least a portion of one major surface of the web or sheet is provided with a coating of a bond-enabling material for bonding to toner particles. When toner particles are printed onto these coated layers and two toner-bearing areas are brought into contact and subjected to heat and pressure, a permanent bond is formed between the two areas, the toner particles adhering to one another and to the bond-enabling coatings which serve to bond the toner particles strongly to the surfaces of the substrates. The adhesive bond which is formed could not be achieved by the use of either toner alone or by bond-enabling material.

The bond-enabling material comprises a coating which forms a film on the surface of the sheet, and is resistant to melting or degrading when exposed to temperatures used for fusing toner images. Preferably, the bond-enabling material is a thermoplastic polymer applied to the sheet at a coating weight of between about 0.3 to 2.0 lb/ream (17"×22"×500 sheets), and is applied as a liquid and then dried or cured. In addition to maintaining toner particles on the surface of the sheet, the bond-enabling material may also act as a tie coat to enhance the adhesion of toner particles to the surface of the sheet.

In one embodiment of the invention, the bond-enabling material comprises 100% solids ultraviolet curable thermoplastic polymerized or polymerizable material selected from the group consisting of reactive monofunctional monomeric acrylates, rubber-modified epoxy diacrylate oligomers, and thermoplastic rubbers. The bond-enabling material may be applied to the web or sheet as a liquid by any conventional printing or coating processes such as flexographic, gravure, or dry offset printing. The bond-enabling material is then cured by exposure to ultraviolet radiation to result in a solid, nontacky coating.

In another embodiment of the invention, the bond-enabling material comprises a copolymer of styrene and acrylic acid and a crosslinking agent.

In yet another embodiment of the invention, the bond-enabling material is selected from the group consisting of carboxylated styrene-butadiene latexes, styrene-butadiene latexes, alkyd resins, olefin waxes and emulsions, acrylic resins, phenolic resins, and polyvinyl alcohol. The bond-enabling materials of the present invention are effective for use on both porous and nonporous cellulosic and polymeric substrates.

In a preferred embodiment of the invention, toner particles are printed onto the peripheral edges of the sheet containing the bond-enabling material. The sheet is then sealed by folding the sheet so that at least a portion of its peripheral edges align, and heat and pressure are applied to the peripheral edges of the sheet.

The sheet product may optionally include printed indicia on at least one of its major surfaces and form a business form or mailer. In addition, the sheet may include a cut out window so that when it is folded and sealed, a portion of the printed indicia is visible through the cut out window. Thus, the sheet may be printed in a single pass through a printer without having to print address information on the outside of the form. In another embodiment of the invention, the sheet may include perforations located inside at least one of the peripheral edges of the sheet so that the sealed edges may be removed for opening of the mailer or business form.

In an alternative embodiment of the invention, the sheet product is not folded for sealing, but rather is sealed to a second sheet having a coating of the bond-enabling material on at least a portion of one major surface thereof. After application of toner to one or both sheets, the second sheet is collated on top of the first sheet product such that their respective coated areas are in contact, and the two sheets are sealed together by applying heat and pressure. The sheet product may include printed indicia on at least one of its major surfaces. In addition, a die cut window may be provided on the second sheet so that indicia printed on the first sheet is visible through the window when the sheets are sealed.

A method for making the sheet product is also provided which generally comprises the steps of providing a web or sheet having two major surfaces, and coating a portion of one major surface of the sheet with a bond-enabling material for adhering to the toner particles on the surface of the sheet. Toner particles are printed on the coated areas of the sheet surface, and the sheet is then folded and sealed by the application of heat and pressure on the coated areas.

An alternative method of making the sheet product comprises the steps of providing a first web or sheet having two major surfaces, and coating a portion of one major surface of the sheet with a bond-enabling material for adhering to toner particles on the surface of the sheet. Toner is then printed on the coated areas of the sheet surface. A second sheet having two major surfaces is provided which is coated with the bond-enabling material on the corresponding areas of one major surface. The second sheet is then collated on top of the first sheet such that their coated areas are in contact, and their respective coated areas are sealed by the application of heat and pressure.

The present invention thus provides a mailer or business form which may be effectively sealed by using toner as an adhesive in combination with a bond-enabling material which prevents the toner from sinking into the surface of the sheet and also enhances the adhesion of toner to the sheet surface. Accordingly, it is an object of the present invention to provide a web or sheet product coated with a bond-enabling material for adhering toner particles, when printed on the surface of the sheet to improve sealing of the sheet using the toner as the adhesive.

It is also an object of the present invention to provide a polymeric web or sheet product coated with a bond-enabling material which provides an adhesive bridge between toner particles and a polymeric surface when toner is printed on the surface of the sheet, to improve sealing of the sheet using toner as the adhesive. These, and other objects and advantages of the present invention will become apparent from the following detailed description, the accompanying drawings, and the appended claims.

BRIEF DESCRIPTION OF THE DRAWINGS

FIG. 4 is an alternative embodiment of the sheet product illustrated in FIG. 3; and FIG. 5 is a front plan view illustrating the folded, sealed product of the present invention in the form of a mailer.

Detailed Description of the Preferred Embodiments

Figure 3:
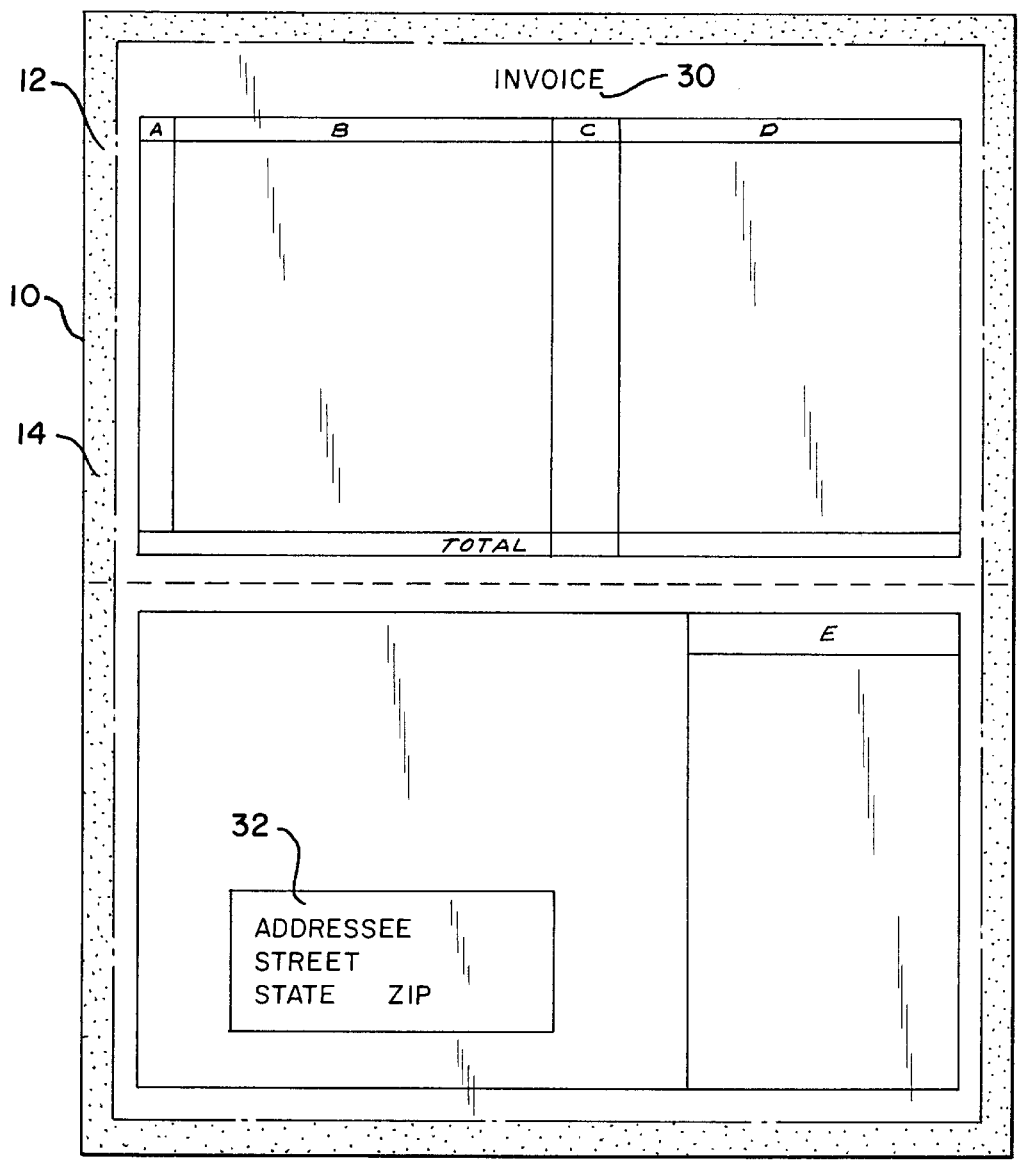
FIG. 3 is a front plan view of a sheet product in accordance with the present invention.

The preferred sheet product of the present invention is illustrated in FIG. 3 and comprises a cellulosic substrate 10 having two major surfaces. The sheet may be cellulosic or polymeric, and either porous or nonporous. At least a portion of the peripheral edges of one major surface of the sheet are coated with a bond-enabling material 12 for maintaining toner particles printed on the peripheral edges of the sheet. The bond-enabling material may optionally be coated on the entire surface of the sheet to act as a tie coat to enhance the adhesion of all toner indicia printed on the sheet surface.

The bond-enabling material comprises a polymer which forms a film on the surface of the sheet, and is preferably coated on the sheet as a liquid and then dried or cured. Preferably, the bond-enabling material is applied to the sheet at a coating weight of between about 0.3 to 2.0 lb/ream (17"×22", 500 sheet ream). In addition to maintaining toner particles on the surface of the sheet, the bond-enabling material may act to enhance the adhesion of toner particles to the surface of the sheet and is resistant to melting, or degrading when exposed to temperatures used for fusing toner images. Typical temperatures used in toner fusing rolls range from about 250° F. to above 300° F.

In one embodiment of the invention, the bond-enabling material comprises an ultraviolet curable thermoplastic polymerized or polymerizable material selected from the group consisting of reactive monofunctional monomeric acrylates, rubber-modified epoxy diacrylate oligomers, and thermoplastic rubbers. The bond-enabling material may be applied to the substrate as a liquid by any conventional printing or coating processes such as flexographic, gravure, or dry offset printing. The bond-enabling material is preferably applied to the substrate at a coating weight of between about 0.8 and 1.2 lb/ream. The bond-enabling material is then cured by exposure to ultraviolet radiation to result in a solid, nontacky coating. See commonly assigned, copending U.S. application Ser. No. 07/822,680, filed Jan. 21, 1992, and entitled Radiation Curable Toner Adhesion-Enhancing Composition and Coated Product, the disclosure of which is hereby incorporated by reference.

In another embodiment of the invention, the bond-enabling material comprises a copolymer of styrene and acrylic acid and a crosslinking agent. The bond-enabling material is preferably applied to the web as an aqueous dispersion and then dried by conventional means as discussed in U.S. Pat. No. 5,045,426, the disclosure of which is hereby incorporated by reference. Preferably, the bond-enabling material is applied to the substrate at a coating weight of between about 0.3 and 1.0 lb/ream, and most preferably about 0.6 lb/ream.

In yet another embodiment of the invention, the bond-enabling material is selected from the group consisting of carboxylated styrene-butadiene latexes, styrene-butadiene latexes, alkyd resins, olefin waxes and emulsions, acrylic resins, phenolic resins, and polyvinyl alcohol. The bond-enabling material is applied at a coating weight of from about 0.3 to about 2.0 lb/ream, and preferably between about 0.5 to about 1.0 lb/ream. For this embodiment of the invention, the bond-enabling material preferably is as taught in Pinell et al, copending U.S. application Ser. No. 07/339,972, filed Apr. 18, 1989, and entitled Toner Adhesion Enhancing Coating and Coated Paper, the disclosure of which is hereby incorporated by reference. Other bond-enabling materials useful in the practice of the present invention are taught in U.S. Pat. Nos. 5,102,737 and 5,017,416, the disclosures of which are incorporated by reference.

As shown in FIG. 3, toner particles 14 are then printed on the peripheral edges of the sheet on the bond-enabling material. As shown in FIG. 5, the toner particles 14 may be printed in the form of a striped pattern on the peripheral edges of the sheet. By printing toner in such a striped pattern, less toner is required to achieve effective adhesion because the toner stripes overlap and/or criss-cross once the sheet is folded. However, it should be appreciated that a number of different toner patterns may be printed on the sheet which result in an effective seal such as angled stripes or cross-hatched stripes. Descriptions of noncontact printers useful in the present invention such as laser printers, the toners used therein, and the papers used for printing on them are known. See, for example, "New Papers for New Printers," Chemtech (1986), the disclosure of which is hereby incorporated by reference. Other nonimpact printers such as magnetographic, ion deposition, and thermal transfer printers may also be used in the practice of the invention.

As shown in FIG. 3, the sheet product may optionally include printed indicia on at least one of its major surfaces. The indicia may consist of repetitive indicia 30 which can be pre-printed on the form or mailer using conventional flexographic or lithographic printing processes. Non-repetitive, individualized indicia 32 such as name, address, billing amounts, etc. may also be printed on the form or mailer by the nonimpact printer at the same time the toner edges are printed.

As shown in FIG. 4, the sheet may also include a cut out window 16 so that when the sheet is folded and sealed, a portion of the printed indicia is visible through the cut out window. Transparent plastic window 18 is optional. The sheet may also include perforations 20 located inside at least one of the peripheral edges of the sheet so that the sealed edges may be easily removed for opening.

Figure 6:
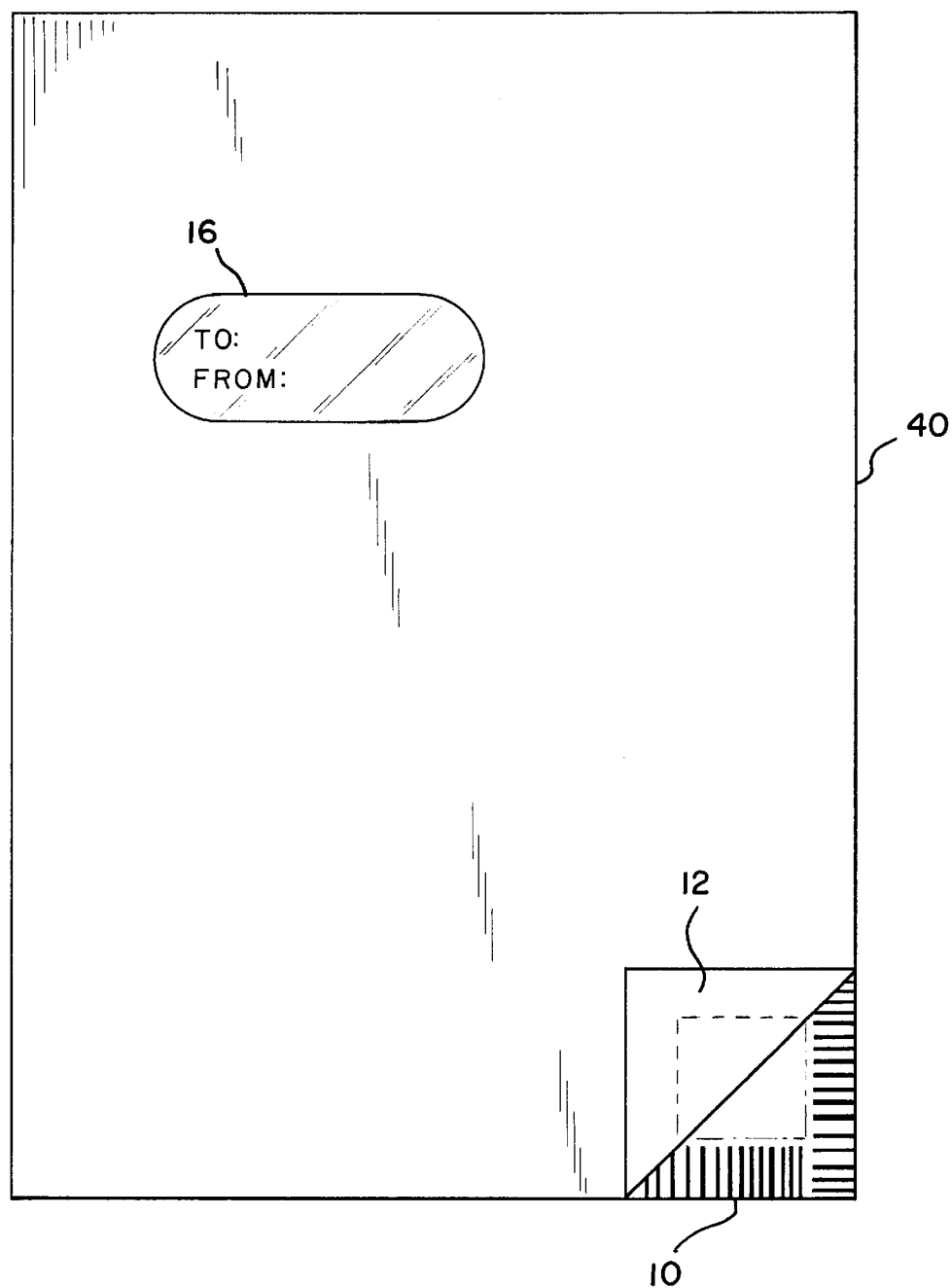

FIG. 6 illustrates an alternative embodiment of the invention in which the sheet 10 is sealed to a second sheet 40 having two major surfaces and optionally having a coating of the bond-enabling material 12 on the peripheral edges of at least one of its major surfaces. The second sheet is collated on top of the sheet product such that their respective coated edges are in contact, and the two sheets are sealed along their respective peripheral edges by applying heat and pressure. The sheet product may include printed indicia on at least one of its major surfaces, and a die cut window 16 may be provided on the second sheet so that indicia printed on the sheet product is visible through the window.

Figure 1:
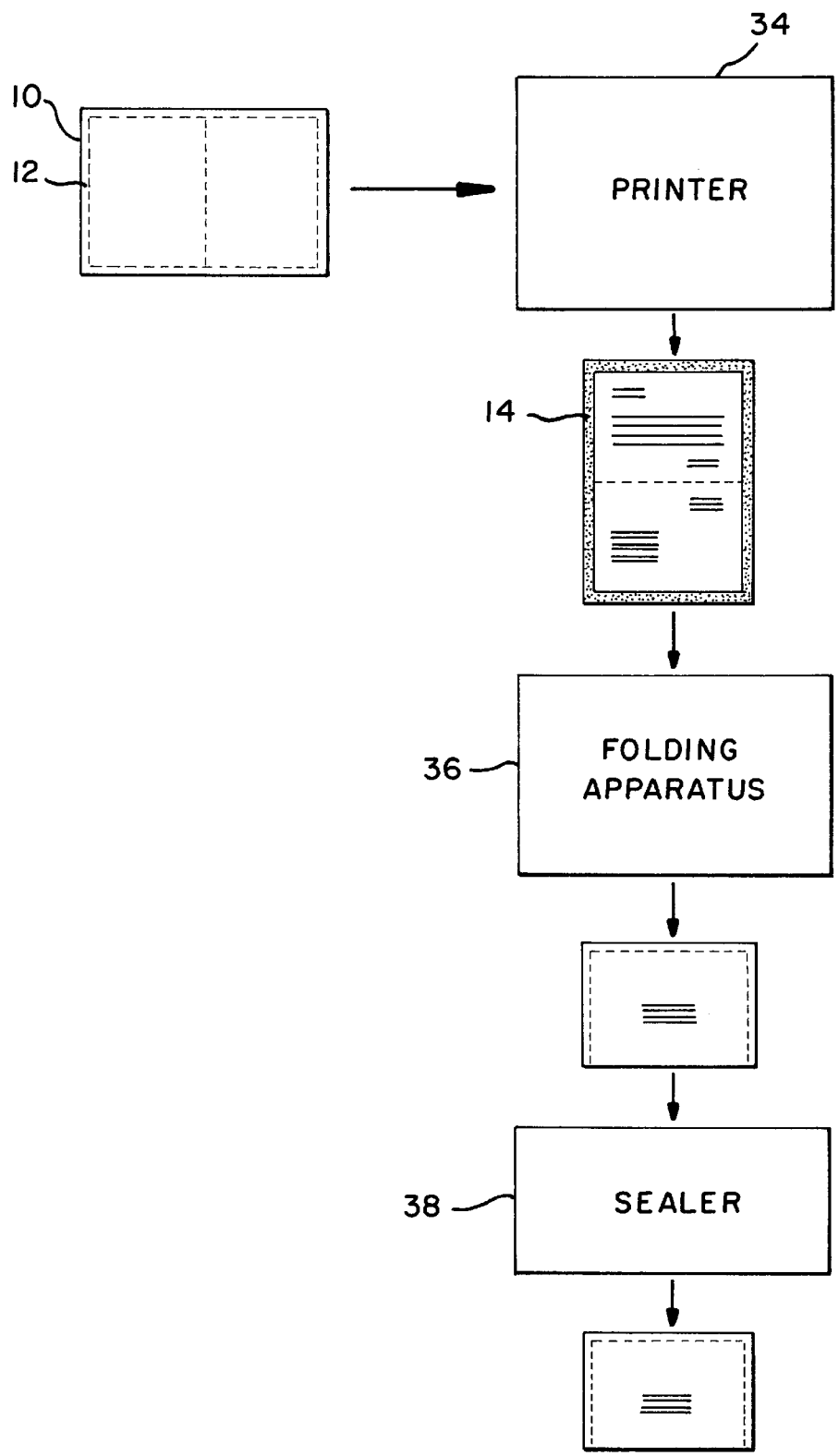
FIG. 1 is a schematic representation of the printing, folding and sealing steps of the present invention.

FIG. 1 illustrates a method of making one embodiment of the web or sheet product of the present invention which comprises the steps of providing a web or sheet 10 with a coating on the peripheral edges of one major surface of a bond-enabling material 12. The bond-enabling material may be printed or coated onto the web by any of a number of conventional techniques including printing by means of a flexographic press, offset gravure coating, direct blade coating, roll coating, or air knife coating. Further, the coating may be applied directly on the paper by the use of a gate roll, twin gate roll, blade, or bill blade coaters. The sheet is then passed through a nonimpact printer 34 where toner particles 14 are printed on the peripheral edges of the sheet and non-repetitive indicia is also printed. The sheet may then require a second pass through the printer to print the address information on the opposite surface of the sheet. Alternatively, if a cut out window is included on the sheet, it may be printed in a single pass. The sheet is then passed through a folding apparatus 36 which folds the sheet along at least one of its major axes. Finally, a sealing apparatus 38 applies heat and pressure to the edges of the sheet to fuse the toner particles and seal the sheet. European patent No. 245424 and Swedish patent application No. 8505243, both of which are incorporated herein by reference, describe suitable sealing mechanisms for sealing the sheet or sheets of the present invention.

Figure 2:
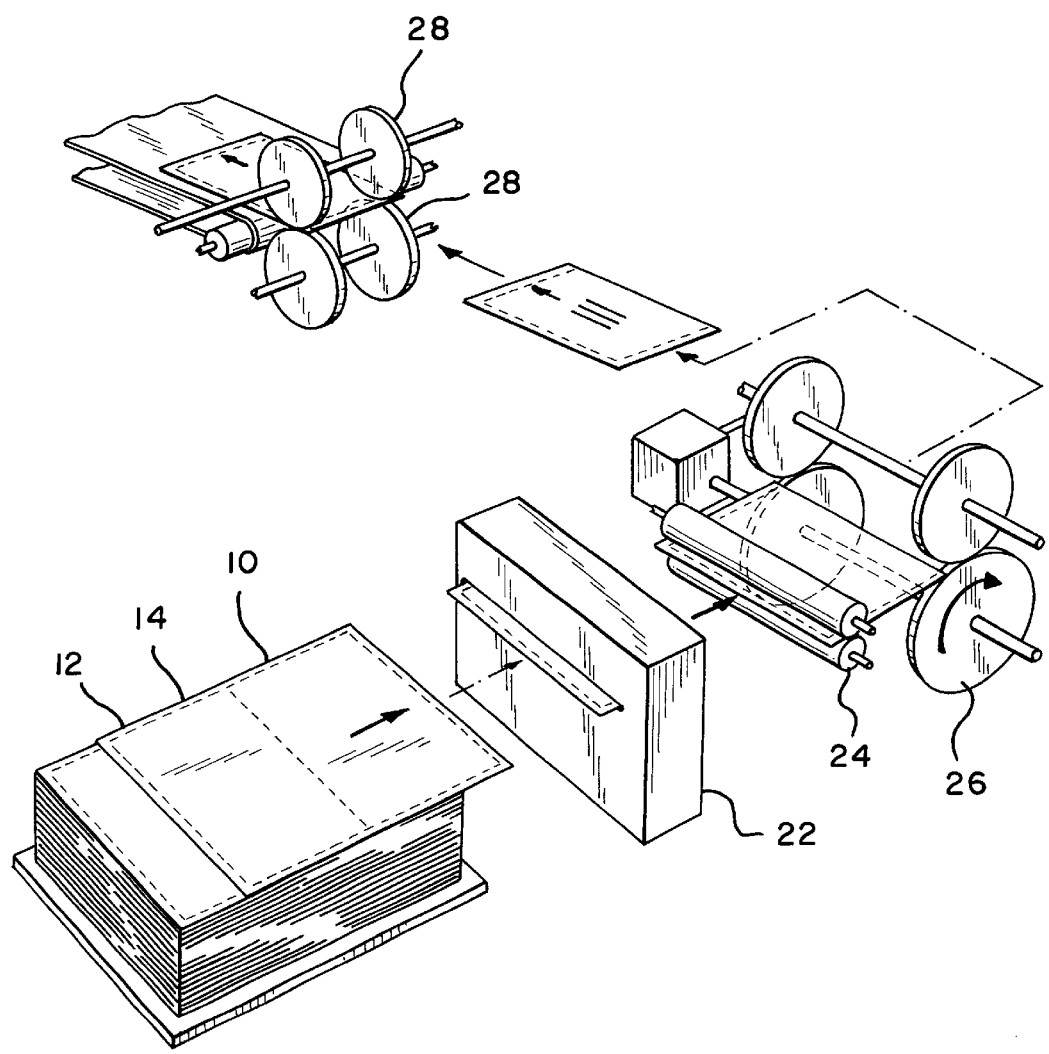
FIG. 2 is a schematic perspective view of a device for folding and sealing the web or sheet product of the present invention.

FIG. 2 schematically illustrates a typical folding and sealing apparatus which may be used for the web or sheet product of the present invention. The sheet 10 having indicia (not shown) already printed thereon is advanced through a folding means 22, and is then advanced between feed rollers 24 and through a sealing means which includes a heating element (not shown) and sealing rollers 26 and 28 through which the sheet is sequentially passed.

An alternative method of making the sheet product comprises the steps of providing a first web or sheet having two major surfaces, and coating a portion of one major surface of the sheet with a bond-enabling material for adhering toner particles on the surface of the sheet. Toner particles are then printed on the coated areas of the sheet surface. A second sheet having two major surfaces is provided which is coated with the bond-enabling material and optionally toner on the coated areas of one major surface. The second sheet is then collated on top of the first sheet such that their coated areas are in contact, and their respective coated areas are sealed by the application of heat and pressure.

The cellulosic or polymeric product of the present invention may have a variety of potentially useful applications. For example, the present invention may be used to seal mailers or business forms printed with a laser or other nonimpact printer without the need for hot melt adhesives or self-adhesives. In addition, the present invention may be used to provide a means for ensuring the confidentiality of information received by facsimile transmission in which a laser printer is utilized. The paper to be printed with information by facsimile is coated on at least its peripheral edges with the bond-enabling material. The laser printer is programmed to print toner on the peripheral edges of the paper simultaneously with information transmitted by facsimile. The laser printer may be provided with means for folding the output sheet and applying heat and pressure in the manner illustrated in FIG. 2. The fax sheet may also include a cut out window so that when folded, the intended recipient's name is visible through the window.

As an alternative to folding the fax sheet, a second sheet having the bond-enabling coating on at least its peripheral edges may be sealed to the fax sheet as a cover sheet. The printer may be provided with means for collating the two sheets and applying heat and pressure to seal the sheets together. A cut out window may be provided on the second sheet so that the recipient's name is visible through the window after it is sealed to the sheet product. The sealed information may then be exposed by peeling the sealed portions from each other or by cutting or tearing away the peripheral edges of the sheets.

While the drawings show the bond-enabling coating at the peripheral edges of the form or mailer sheets, it should be understood that bond-enabling material may be coated in any convenient areas of the sheets consistent with the design and use of the forms or mailers, and may be even coated over the entire area of one surface.

While certain representative embodiments and details have been shown for purposes of illustrating the invention, it will be apparent to those skilled in the art that various changes in the methods and apparatus disclosed herein may be made without departing from the scope of the invention, which is defined in the appended claims.

What is claimed is:

1. A method of making a web or sheet product comprising the steps of:

providing a web or sheet having two major surfaces, coating a portion of one major surface thereof with a bond-enabling material for adhering toner particles on the surface of said sheet, printing toner particles on said coated areas of said sheet, folding said sheet along at least one major axis and sealing said folded sheet by the application of heat and pressure to said folded sheet to fuse said toner particles.

2. The method of claim 1 wherein said sheet includes printed indicia on at least one major surface thereof.

3. The method of claim 2 wherein said sheet includes a cut out window such that when said sheet is folded and sealed, a portion of said printed indicia is visible through said cut out window.

4. The method of claim 1 in which said web or sheet comprises a cellulosic substrate.

5. The method of claim 1 in which said web or sheet comprises a polymeric substrate.

6. The method of claim 1 in which said bond-enabling material is coated at a coating weight of between about 0.3 to 2.0 lb/ream.

7. The method of claim 1 in which said bond-enabling material comprises an ultraviolet curable thermoplastic polymerized or polymerizable material selected from the group consisting of reactive monofunctional monomeric acrylates, rubber-modified epoxy diacrylate oligomers, and thermoplastic rubbers.

8. The method of claim 1 in which said bond-enabling material comprises a copolymer of styrene and acrylic acid and a crosslinking agent.

9. The method of claim 1 in which said bond-enabling material is selected from the group consisting of carboxylated styrene-butadiene latexes, styrene-butadiene latexes, alkyd resins, olefin waxes and emulsions, acrylic resins, phenolic resins, and polyvinyl alcohol.

* * * * *